E. E. NEAL.
BALL GAGING MACHINE.
APPLICATION FILED JULY 12, 1911.
1,166,537.
Patented Jan. 4, 1916.
3 SHEETS—SHEET 1.
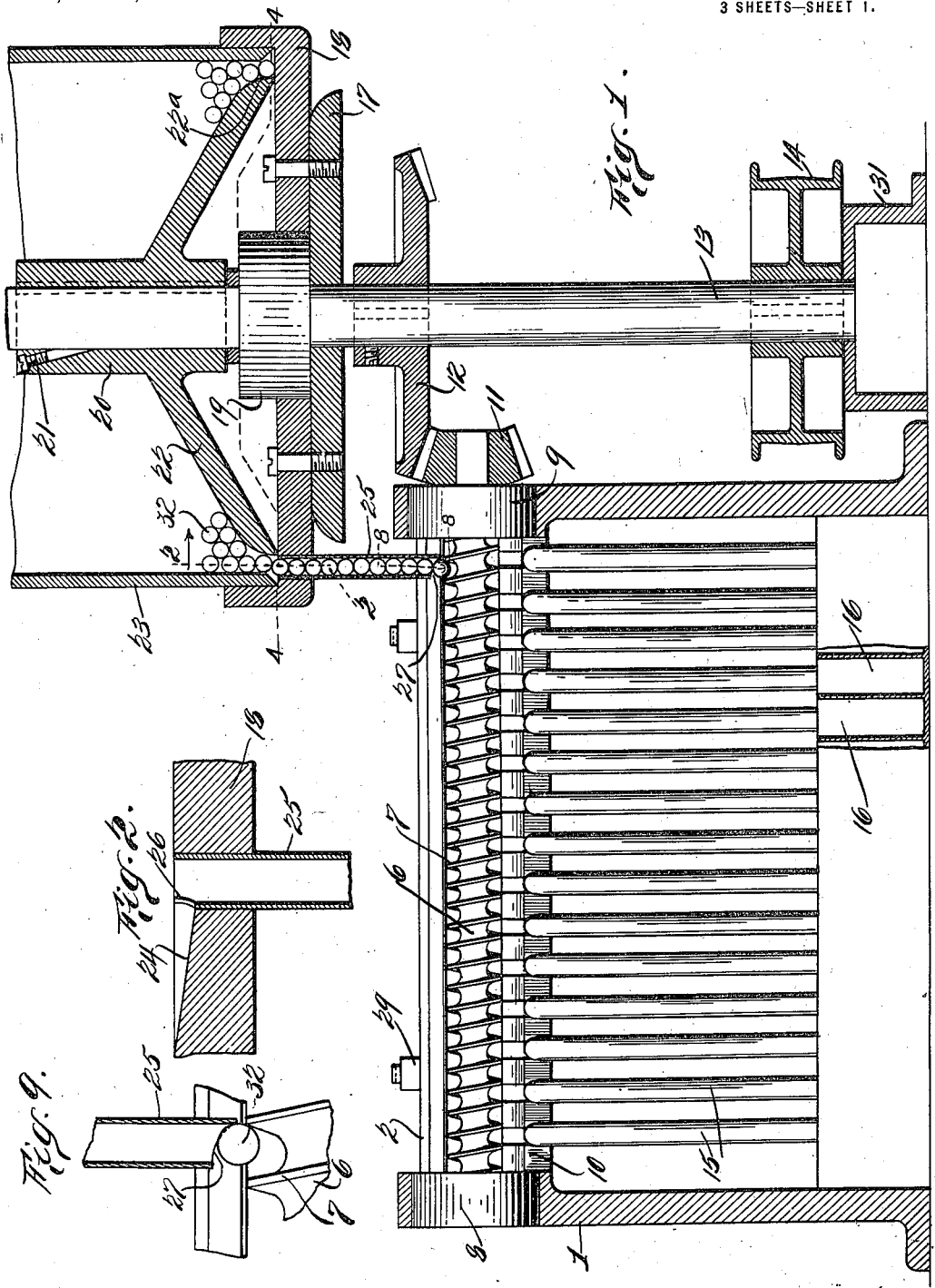
Witnesses:
C. A. Jarvis
A. Bernstein
Inventor:
Elmer E. Neal.
by Newell & Neal
attorneys

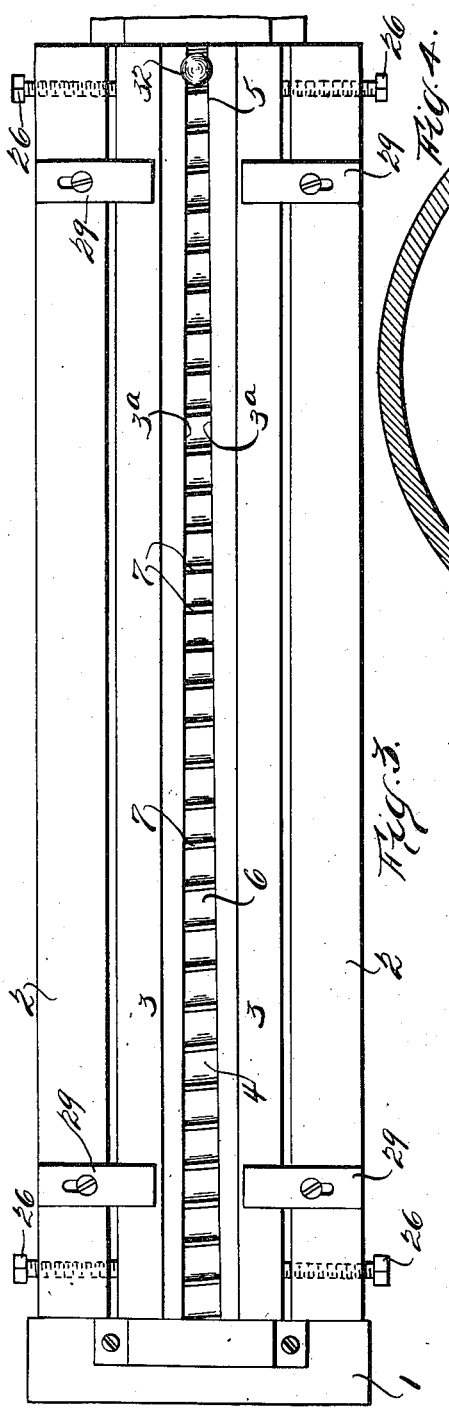

E. E. NEAL.
BALL GAGING MACHINE.
APPLICATION FILED JULY 12, 1911.
1,166,537.
Patented Jan. 4, 1916.
3 SHEETS—SHEET 3.
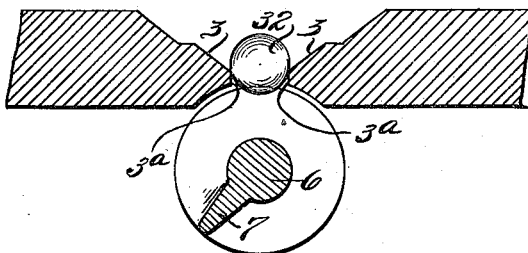
Fig. 6.
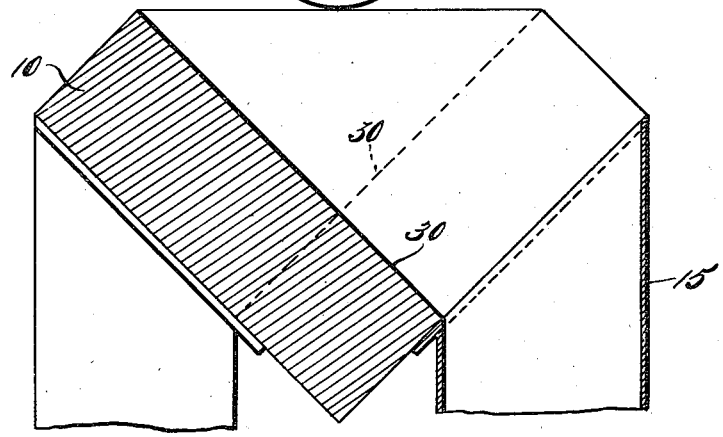
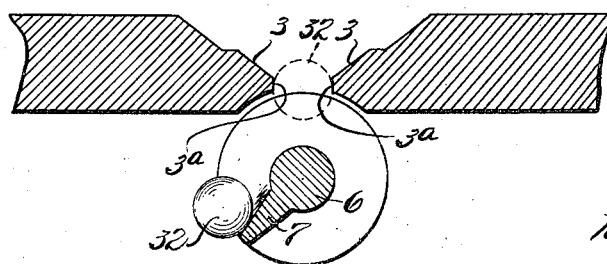
Fig. 7.
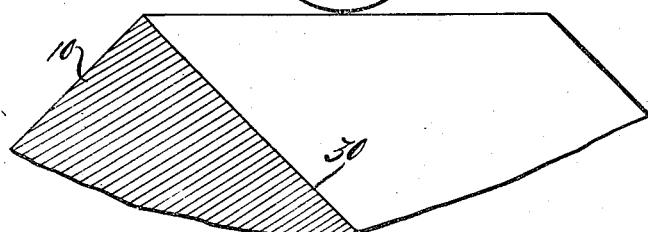
Fig. 8.
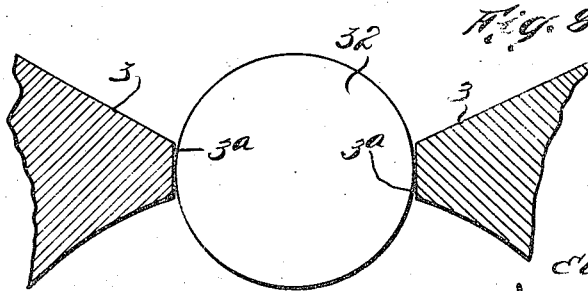
Witnesses:
Inventor:
Elmer E. Neal.
by Newell & Neal
attorneys.

UNITED STATES PATENT OFFICE.

ELMER E. NEAL, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

BALL-GAGING MACHINE.

1,166,537.  Specification of Letters Patent.  Patented Jan. 4, 1916.

Application filed July 12, 1911. Serial No. 638,072.

*To all whom it may concern:*

Be it known that I, ELMER E. NEAL, a citizen of the United States, residing at Bristol, Connecticut, have invented certain new and useful Improvements in Ball-Gaging Machines, of which the following is a clear, full, and exact description.

My invention relates to a machine for gaging and separating balls of different sizes, particularly those spherical steel balls manufactured for use in ball bearings for which purpose it is very desirable to have balls of exactly the same size. It is well-known that all balls coming from the same ball-grinding machine are not exactly of the same size although they vary but slightly and the differences are usually measured by the thousandths of an inch.

One object of my invention is to provide a machine for accurately gaging and separating these balls according to size and for carefully discriminating between balls differing in diameter by the slightest amount.

To this end and also to improve generally upon devices of the character indicated my invention consists in the following matters hereinafter described and claimed.

The present machine is of that general class employing an expanding slot along which the balls are adapted to travel and through which the balls will pass when reaching a width corresponding to their diameter. Usually in machines of this character, however, the slotted track or guideway along which the balls travel has been arranged at an incline so that the balls will roll down the same by gravity, and due to their increased momentum as they travel along the slot the balls often over run the point where they should normally drop through. Furthermore if the defining edges or sides of the slot are adjusted to diverge with a very slight angle so as to obtain fine distinctions between different sizes of balls, the balls will not roll along the same to a point where they will freely fall through but will have a tendency to gradually sink through the slot as they roll along under the force of gravity until they wedge or stick, and thus obstruct other balls coming down the guideway and hold up the operation of the machine. For the above reasons the old form of machine must be operated very slowly and for continual operation the constant attention of an operator is required. To avoid the tendency of balls to wedge as they roll down the inclined slot, the sides of the slot in these old machines were usually brought to a sharp knife edge, which knife edge very quickly deteriorated and lost its straightness under the traveling friction of the balls so that for any accurate gaging frequent replacement or regrinding of these sharp straight edges was necessary.

It will be apparent from the principle of operation of my machine hereinafter described that the sides of the slot, instead of being sharp, may be made of considerable width, in order to provide a wearing surface and yet attain the accurate gaging desired.

It is understood of course that the particular machine shown and described in the present application illustrates merely a preferred form of construction and arrangement of parts which, it has been found, will successfully carry out the principles of my invention, and that various changes and modifications of details may be easily made without departing from the spirit of my invention as defined in the appended claims.

In the drawings which show the preferred embodiment of my invention Figure 1 is a longitudinal section of the machine; Fig. 2 is a detail section through the upper end of the feeding tube along line 2—2 of Fig. 1 or line 2×—2× of Fig. 4; Fig. 3 is a detached plan of the slotted guideway; Fig. 4 is a section through the lower end of the feeding hopper along line 4—4 of Fig. 1 and showing the stationary bottom of said hopper in plan; Fig. 5 is a detail perspective of a portion of the separating device or sorting comb; Figs. 6 and 7 are enlarged, detailed cross-sections of the slotted guideway, propelling screw and separating device, showing their relative location and the action of a ball passing through the slot; Fig. 8 is an enlarged fragmentary section of the defining edges of said slot showing their wearing surfaces; Fig. 9 is a detail section of the lower end of the feeding tube through line 8—8 Fig. 1; and Fig. 10 is an enlarged detail showing the lifting action of the propelling device upon a ball.

Referring more particularly to the drawings, the main frame of the machine is indicated at 1 and preferably supported on the upper side or table 2 of this main frame are rails 3 spaced apart to form a slotted guideway as shown in Fig. 3. These rails are preferably disposed so that their inner gaging slot defining edges or sides 3ª diverge slightly along their length to form a gaging slot expanding from the narrow end 5 to the broader end 4 as shown in Fig. 3. It is obvious that curved rails forming a curved or circular expanding slot might be equally well used. Any suitable adjustable clamps such as 29 may be employed to accurately space and hold the rails 3 in position. It is clear that a spherical ball such as 32 shown in Fig. 3 traveling along the slotted gaging guideway formed by the rails 3 will finally reach a width of the slot corresponding to its diameter, whereupon it will drop through and it is equally clear that balls of different sizes will drop through at different points along this slot. By providing a separating device below the slot for collecting in different receptacles the balls which fall through at different points, the assorting and separating of said balls is accomplished. This slotted guideway is preferably arranged in a horizontal position as shown in Fig. 1 although of course it may be inclined from either end without a material change, since I provide a positive controlling means for causing the balls to travel along the same. This positive controlling device is preferably in the form of a longitudinally rotating screw 6 located adjacent the slot preferably at the lower side as shown, and mounted in bearings 8 and 9 at the upper side of the frame 1, and it may be driven in any suitable manner as by means of beveled gears 11 and 12 from the driving shaft 13 having a pulley 14 thereon adapted to receive power from a driving belt. The screw 6 is preferably disposed with its thread 7 adjacent the lower edge of the slot as shown in Figs. 6 and 7 so as to engage the lower side of the balls 32 resting upon the rails 3, and it is obvious that when rotating, the thread 7 acts to propel or control the travel of the balls along the slot until they reach a point where they will pass through. The propelling screw 6 may be disposed above the slot, but I preferably locate it below the same so that the thread 7 will engage the lower side of the ball 32 below its center as shown in Figs. 6 and 10 and give a slight lifting effect to counteract the tractional effect of gravity on the ball. This insures an easy travel of the ball along the rails 3 and prevents any tendency of the same to gradually sink through the defining edges 3ª and wedge as is the case when gravity alone is relied upon to carry the balls along the guideway. Figs. 6 and 7 illustrate this quite clearly in which Fig. 6 shows the ball 32 resting upon the defining edges 3ª with the thread 7 of the screw in engagement therewith, while Fig. 7 shows a ball in two positions in the act of passing through said slot.

Evidently, because of the lifting effect of the propelling means, which prevents the wedging of the balls between the sides of the slot, I am not confined to the use of the quick wearing knife edges of the old machines but, on the contrary, may well use comparatively thick slot defining sides such, for example, as those indicated at 3ª in Fig. 8, thus materially increasing the period of time during which a slot side can be used without regrinding.

By providing a gage slot whose sides are in effect relatively fixed definite edges and by providing a propelling and controlling means (e. g., the screw) which forms no part of the gage slot I eliminate the inherent inaccuracies, excessive wear and impossibility of accurate first grinding or subsequent regrinding necessarily incident to those machines in which a screw is also utilized as a side of the grading aperture.

By the use of a screw or the like I provide a means for propelling the balls which controls their speed and also partially supports them thereby preventing them from jamming in the guideway under their own weight. Moreover I also provide a travel-controlling means which at all times and as long as a ball remains above the slot permits the ball to remain in contact with the slot sides thereby to travel over every portion of the slot sides just up to the proper gage-point. Thus there can be no possibility, such as occurs in "step by step" machines, either of a ball being carried ahead of the proper gage-point or of a ball being forcibly driven through the slot behind the proper gage-point by the force resulting from the falling or dropping of the ball from above the slot into it.

Although I have shown my controlling or propelling device preferably in the form of a rotating screw, nevertheless it is obvious that other movable devices may be employed to engage the ball for positively carrying the same along the guideway in the manner herein shown.

A preferred form of a feeding means for supplying the balls successively to one end of the slotted guideway is herein shown which combines very effectively with said controlling device in feeding the balls thereto singly so that they may be taken care of and carried along said slotted guideway, one at a time. The feeding device herein shown is preferably constructed in the form of a rotating hopper in which the exterior shell 23 and false bottom 22 are arranged to rotate together over a stationary bottom 18 fixed to a stationary portion of the frame such as 17.

The shell 23 may be secured to the vertically disposed driving shaft 13 (said connection not being shown) and the false bottom 22 likewise keyed to said shaft by sleeve 20 and secured by stud screw 21 to rotate with the same. It will be observed that the false bottom 22 of the hopper is inclined downwardly from its central portion toward the shell 23 and its periphery 22ᵃ is spaced from said shell 23 to form a peripheral slot which may be slightly wider than the diameters of the balls carried in said hopper. The stationary bottom 18 lying below this slot may have at different points around its periphery outlet feeding tube openings such as 25 leading to separate gaging devices such as the one herein shown and described. The feeding tube 25 of the hopper is shown more clearly in Figs. 2 and 9 and is cut away at its upper end and at one side, as at 26, and a runway 24 in the bottom 18 leads to the opening 26. The front lower portion of said feeding tube 25 adjacent the slotted guideway 3—3 is also sufficiently cut away as shown at 27 to allow the balls to issue therefrom in single file. It is obvious that the balls contained within the hopper are in constant agitation when the same is rotated and are continually rolling around the peripheral portion of bottom 18 within the peripheral slot of said rotating hopper and are constantly trying to find an outlet through the feeding tube or tubes 25, due to the said rolling travel and the pressure of the balls above. The run-way or groove 24 leading to the feeding tube 25 facilitates the feeding of the balls therethrough while the cut away portion 27 at the bottom of said tube absolutely insures one ball at a time being removed therefrom by the thread 7 of the rotating screw 6.

The means for collecting and keeping separate the balls of different sizes which fall through the slotted guideways at different places is preferably constructed as shown in detail in Figs. 5, 6 and 7, and consists of a comb-like structure with alternately disposed inclined guideways 30 leading to collecting tubes 15 at each side of the same, which tubes may empty into suitable receptacles such as 16 located at any convenient place. The comb-like separating device 30 is of course placed directly below the slot of the guideway 3—3 as shown in Figs. 6 and 7 so that the balls dropping through said slot will be received in one or the other of the guiding slots 30 and directed to its proper receptacle 16. The rotating screw 6 in no way interferes with the passing of the balls downwardly to this separating comb as the slots 30 at the upper side of the same extend beyond the width of said screw at each side as shown.

The operation of this machine as above described will be obvious and may be briefly summarized as follows: When power is applied to the driving shaft 13 the balls contained in the rotating hopper will be successively fed in a continuous stream through feeding tube 25 to the narrow end of the slotted guideway formed by the rails 3—3. The rotating screw 6 by means of its thread 7 picks off one ball at a time from the lower end of the tube 25 and carries the same along said slotted guideway until the ball reaches a place in the slot equal to its diameter, whereupon it will fall through and be deflected by the guide slots 30 into a receptacle where all balls of equal size will be similarly gaged and directed. It is evident that the screw 6 herein shown acts as both a propelling device and a controlling device, acting to propel the balls positively when said slotted guideway is horizontal or inclined upwardly, and controlling the over-running of the balls by gravity if said slot is inclined downwardly. I therefore do not wish to confine myself to any particular form of controlling device for producing this uniform speed of travel of the balls along the expanding slot, as many and various other forms will be quickly apparent when once the advantageous results are appreciated by the use of the preferred construction herein shown.

It will be seen that I have provided a device of the character indicated which provides for the proper delivery of the articles to be gaged to the gaging slot, in which the uniform constant travel of the articles along the sides of the gaging slot just up to the proper gaging point is insured, in which the articles are partially supported in their travel along the slot thereby preventing their jamming in the slot due to their partial sinking therethrough under their own weight, in which the sides of the gaging slot can be accurately ground, reground, and rigidly set with relation to each other and which withal is efficient, simple, precise and comparatively inexpensive to build and operate.

Having thus described my invention what I claim as new and desire to secure by Letters Patent is:—

1. In a device of the character indicated, in combination, a gaging guideway presenting a gaging slot along which articles to be gaged are adapted to travel in contact with the sides thereof, said slot having relatively fixed sides at different distances from each other, and means for at all times partially supporting each of said articles during its entire travel along said guideway; substantially as described.

2. In a device of the character indicated, in combination, a gaging guideway presenting a gaging slot having thick, relatively fixed wearing and gaging sides at different distances from each other and along which the articles to be gaged are adapted to travel in contact therewith, and means for at all times partially supporting each of said articles during its entire travel along said guideway; substantially as described.

3. In a device of the character indicated, in combination, a gaging guideway presenting a gaging slot along which the articles to be gaged are adapted to travel in contact with the sides thereof, said slot having relatively fixed sides at different distances from each other, and means for causing the articles to travel under control, such means constructed and positioned to at all times partially support each of said articles during its entire travel along said guideway; substantially as described.

4. In a machine for gaging and separating balls, in combination, a slotted guideway along which said balls are adapted to travel in contact therewith, said slot having fixed sides gradually diverging along their length whereby balls of different sizes are adapted to pass through said slot at different points along the same, and means for propelling said balls along said guideway while at the same time continually acting to offset the tractional effect of gravity on said balls during their travel; substantially as described.

5. In a machine for gaging and separating balls, in combination, a slotted guideway along which said balls are adapted to travel, said slot having fixed sides gradually diverging along their length, whereby balls of different sizes are adapted to pass through said slot at different points along the same, a feeding hopper containing a supply of balls and having a stationary unobstructed outlet extending to said guideway large enough for one ball at a time to pass therein, said hopper being moved bodily to keep said balls in continual agitation over said outlet, whereby said balls are continually and in closely adjacent relationship fed through said outlet and means for preserving said relationship and causing the balls to travel under control along said guideway; substantially as described.

6. In a machine for gaging and separating balls, in combination, a slotted guideway along which said balls are adapted to travel, said slot having fixed sides gradually diverging along their length, whereby balls of different sizes are adapted to pass through said slot at different points along the same, a rotating feeding hopper containing a supply of balls comprising a cylindrical shell and conical bottom rotating therewith, said bottom being inclined downwardly from its center toward said shell and spaced therefrom to form a peripheral slot, and a stationary supporting portion beneath said slot with an unobstructed outlet extending to said guideway large enough for one ball at a time to pass therein, whereby balls are continually and in closely adjacent relationship and successively fed to said guideway and means for preserving said relationship and causing the balls to travel under control along said guideway; substantially as described.

7. In a device of the character indicated, in combination, a gaging guideway presenting a gaging slot along which the articles to be gaged are adapted to travel in contact with the sides thereof, said slot having relatively fixed sides at different distances from each other, and means for at all times partially supporting each of said articles during its entire travel along said guideway but always permitting each of said articles to remain in contact with the sides of said slot during its entire travel therealong; substantially as described.

8. In a device of the character indicated, in combination, a gaging guideway presenting a gaging slot along which articles to be gaged are adapted to travel in contact with the sides thereof, said slot having relatively fixed sides at different distances from each other, and means for at all times partially supporting each of said articles during its entire travel along said guideway and at all times permitting each of said articles to pass clear of said slot at the gage-point on said guideway accurately corresponding to such article; substantially as described.

9. In a machine for gaging and separating balls, in combination, a slotted guideway along which said balls are adapted to travel in contact therewith, said slot having fixed sides gradually diverging along their length whereby balls of different sizes are adapted to pass through said slot at different points along the same, and means for propelling said balls along said guideway while at the same time continually acting to offset the tractional effect of gravity on said balls during their travel and at all times permitting each of said articles to pass clear of said slot at the gage-point on said guideway accurately corresponding to such article; substantially as described.

10. In a device of the character indicated, in combination, a gaging guideway presenting a gaging slot along which the articles to be gaged are adapted to travel in contact with the sides thereof, said slot having relatively fixed sides at different distances from each other, and means for at all times partially supporting each of said articles during its entire travel along said guideway but always permitting each of said articles to remain in contact with the sides of said slot during its entire travel therealong and to pass clear of said slot at the gage-point on said guideway accurately corresponding to such article; substantially as described.

11. In a machine for gaging and separating balls, elements presenting a gaging slot having fixed gradually diverging sides providing a trackway along which the balls to be gaged travel, and a rotating screw adjacent said slot and having its threads in position to contact said balls and control their travel, said screw being located below said slot with its threads in position to contact said balls below their centers whereby said screw while controlling the travel of the balls continually exerts a lifting effect upon them; substantially as described.

12. In a machine for gaging and separating balls, elements presenting a gaging slot having fixed gradually diverging sides providing a trackway along which the balls to be gaged travel, and a rotating screw adjacent said slot and having its threads in position to contact said balls to control their travel, said screw being located below said slot and having its threads of sufficient height above the shank of said screw and so spaced as to permit the balls to pass clear of said slot at the gage-points thereof accurately corresponding to their respective diameters and said screw having its threads in position to contact said balls below their centers whereby said screw while controlling the travel of the balls continually exerts a lifting effect upon them and yet permits them to drop through said slot at the gage-points thereof accurately corresponding to their respective diameters; substantially as described.

Signed at New York city, N. Y. this 7th day of July, 1911.

ELMER E. NEAL.

Witnesses:
BEATRICE MIRVIS,
ABRAM BERNSTEIN.